United States Patent
Husain

(10) Patent No.: US 12,417,458 B2
(45) Date of Patent: Sep. 16, 2025

(54) CONTACTLESS PAYMENT FROM A VEHICLE

(71) Applicant: AVATHON, INC., Pleasanton, TX (US)

(72) Inventor: Syed Mohammad Amir Husain, Georgetown, TX (US)

(73) Assignee: AVATHON, INC., Pleasanton, CA (US)

( * ) Notice: Subject to any disclaimer, the term of this patent is extended or adjusted under 35 U.S.C. 154(b) by 22 days.

(21) Appl. No.: 17/525,373

(22) Filed: Nov. 12, 2021

(65) Prior Publication Data

US 2022/0156748 A1    May 19, 2022

Related U.S. Application Data

(60) Provisional application No. 63/113,796, filed on Nov. 13, 2020.

(51) Int. Cl.
| | | |
|---|---|---|
| *G06Q 20/00* | (2012.01) | |
| *G06Q 20/32* | (2012.01) | |
| *G06Q 20/40* | (2012.01) | |
| *G06Q 40/02* | (2023.01) | |

(52) U.S. Cl.
CPC ..... *G06Q 20/40145* (2013.01); *G06Q 20/322* (2013.01); *G06Q 40/02* (2013.01)

(58) Field of Classification Search
CPC . G06Q 20/40145; G06Q 20/322; G06Q 40/02
See application file for complete search history.

(56) References Cited

U.S. PATENT DOCUMENTS

| | | | | |
|---|---|---|---|---|
| 10,504,094 | B1* | 12/2019 | Gaudin | G07C 9/257 |
| 10,949,831 | B1* | 3/2021 | Gaudin | G06Q 20/367 |
| 11,107,047 | B2* | 8/2021 | Kim | G06Q 20/3674 |
| 2016/0063459 | A1* | 3/2016 | Li | H04W 4/44 |
| | | | | 705/39 |
| 2016/0189174 | A1* | 6/2016 | Heath | G06Q 30/0201 |
| | | | | 705/7.29 |
| 2016/0358168 | A1* | 12/2016 | Van Os | G06Q 20/363 |
| 2017/0359762 | A1* | 12/2017 | Yoo | H04W 76/10 |
| 2018/0013211 | A1* | 1/2018 | Ricci | G06F 21/32 |
| 2018/0211718 | A1* | 7/2018 | Heath | G16H 80/00 |

(Continued)

OTHER PUBLICATIONS

SmartLife smart clothing gamification to promote energy-related behaviors among adolescents, IEEE (Year: 2017).*

(Continued)

*Primary Examiner* — Bruce I Ebersman

(57) ABSTRACT

Contactless payment from a vehicle, including: configuring the vehicle with payment information associated with a payment mechanism; receiving a request for payment from a payment recipient; requesting, by the vehicle, permission to transmit at least a portion of the payment information associated with the payment mechanism to the payment receiving mechanism; receiving, by the vehicle, permission to transmit at least a portion of the payment information associated with the payment mechanism to the payment receiving mechanism; and transmitting, from the vehicle to a payment receiving mechanism, at least a portion of the payment information associated with a payment mechanism.

11 Claims, 4 Drawing Sheets

(56) References Cited

U.S. PATENT DOCUMENTS

| | | | |
|---|---|---|---|
| 2018/0213414 A1* | 7/2018 | Be | H04B 1/3822 |
| 2018/0276673 A1* | 9/2018 | Van Os | G06Q 20/227 |
| 2019/0114606 A1* | 4/2019 | Nuzum | G06Q 20/206 |
| 2020/0167761 A1* | 5/2020 | Vityaz | G06Q 20/3276 |
| 2020/0184455 A1* | 6/2020 | Anantha | G06Q 20/3674 |
| 2021/0216991 A1* | 7/2021 | Grassadonia | G06Q 20/385 |

OTHER PUBLICATIONS

Toward the Autism Motor Signature: Gesture patterns during smart tablet gameplay identify children with autism, PMC (Year: 2017).*

* cited by examiner

Right Side View

Front View

Top View

CONTACTLESS PAYMENT FROM A VEHICLE

CROSS-REFERENCE TO RELATED APPLICATION

This is a non-provisional application for patent entitled to a filing date and claiming the benefit of earlier-filed U.S. Provisional Patent Application No. 63/113,796, filed Nov. 13, 2020, herein incorporated by reference in its entirety.

BACKGROUND

Field of the Invention

The field of the invention is contactless payment, or, more specifically, methods, apparatus, vehicles, and products for contactless payment from a vehicle.

Description of Related Art

Current payment systems typically require interactions between a purchaser and a vendor of products or services.

SUMMARY

Contactless payment from a vehicle, including: configuring the vehicle with payment information associated with a payment mechanism; receiving a request for payment from a payment recipient; and transmitting, from the vehicle to a payment receiving mechanism, at least a portion of the payment information associated with a payment mechanism.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
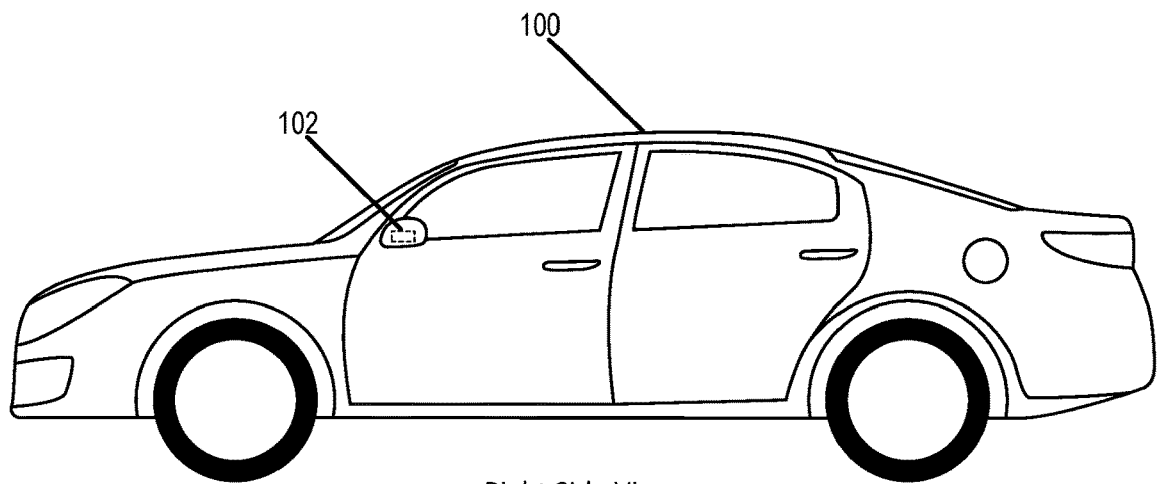
FIG. 1 shows multiple views of a vehicle 100 configured for contactless payment according to some embodiments of the present disclosure.
Figure 1:
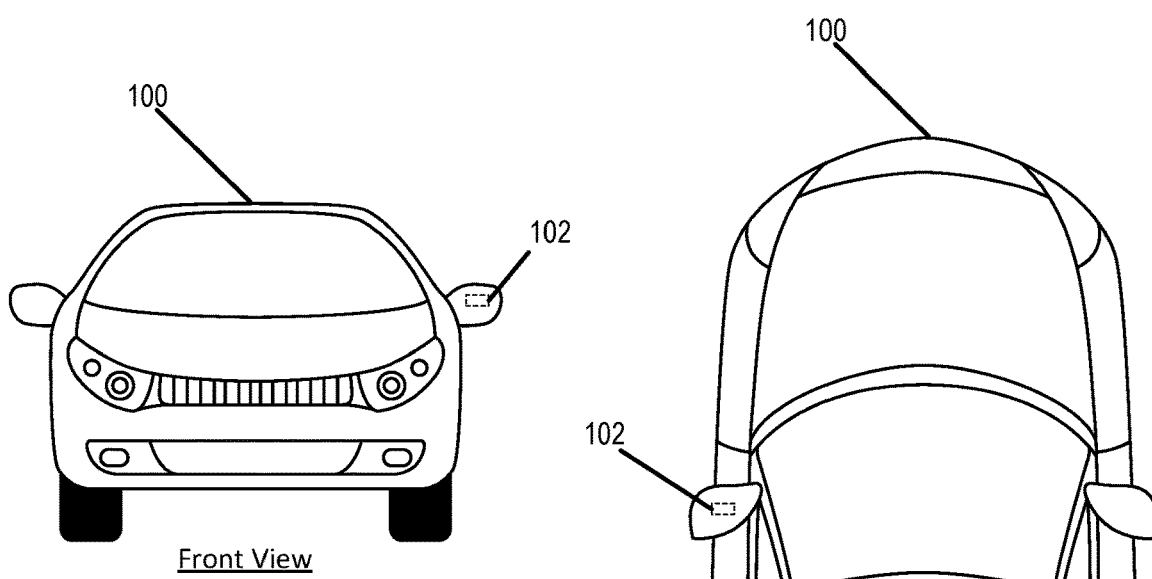

Contactless payment may be implemented in accordance with some embodiments of the present disclosure by a vehicle. Accordingly, FIG. 1 shows multiple views of a vehicle 100 configured for contactless payment according to some embodiments of the present disclosure. The right side view, top view, and front view each illustrate a vehicle 100 that includes a communications device 102 in accordance with some embodiments of the present disclosure. The communications device 102 depicted in FIG. 1 may be embodied, for example, as a near-field-communication ('NFC') device that is embedded within or otherwise attached to the vehicle 100. In other embodiments, the communications device 102 may be embodied as a Bluetooth enabled device, as a communications device that utilizes radio-frequency identification ('RFD') technologies to transmit data, or as some other communications device that can wirelessly transmit data.

The communications device 102 depicted in FIG. 1 is embedded within a driver's side-view mirror of the vehicle 100. It is to be understood that the driver's side may be on a different side of the vehicle in some examples, for examples depending on whether the vehicle 100 is left-hand drive or right-hand drive. In other embodiments, such a communications device may be embedded at other locations within the vehicle 100. For example, a communications device may be embedded within the roof of the vehicle 100, with a door of the vehicle 100, within a bumper of the vehicle 100, within a wheel of the vehicle 100, within a tire of the vehicle 100, within a navigation system of the vehicle 100, within an entertainment system of the vehicle 100, or at some other location within the vehicle 100. Readers will further appreciate that although the example described in the preceding sentence relate to embodiments where the communications device is embedded "within" the locations of the vehicle 100 described above, in other embodiments the communications device may be affixed or otherwise secured to (or integrated into) the locations of the vehicle 100 described above. Readers will further appreciate that the communications devices described above may even make use of other components of the vehicle (e.g., an antenna, an embedded Bluetooth enabled device) to wirelessly communicate with communications devices that are external to the vehicle 100 (or exterior to at least an internal passenger cabin of the vehicle 100). Moreover, although a single communications device 102 is shown in FIG. 1, in alternative embodiments there may be additional communications devices, such as in or proximate to one or more side view mirrors, a front number, a back bumper, a roof, one or more doors, one or more tires or wheels, other locations, or some combination thereof.

Readers will appreciate that in some embodiments, the communications device 102 may be part of the vehicle 100 as originally manufactured, but in other embodiments the communications device 102 may be included in an after-market or third-party component. For example, the communications device 102 may be embedded within a tire that was not made by the manufacturer of the vehicle and was not part of the vehicle 100 as originally constructed by the manufacturer. Likewise, the communications device 102 may be embedded within a wheel, side-view mirror, rear view mirror, antenna, or other component that was not part of the vehicle 100 as originally manufactured, but has become part of the vehicle 100 through modification of the vehicle 100. In some embodiments, the after-market or third-party component may include all of the components (e.g., communications devices, computing devices, storage devices, software components) to perform contactless payment, whereas in other embodiments the after-market or third-party component may provide only a subset of such components such that the after-market or third-party component can only perform a subset of the functions needed to carry out contactless payment from a vehicle. For example, the after-market or third-party component may only include a communications device that receives payment information from a first device (e.g., a smart phone) and transmits such payment information to a second device (e.g., a payment terminal).

In some embodiments, the vehicle 100 may be modified to include a vehicle accessory that is configured for being affixed to the vehicle 100. The vehicle accessory can include a communications device that is configured to receive payment information associated with a payment mechanism and transmit, to a payment receiving mechanism, at least a portion of the payment information associated with a payment mechanism, as described herein. In some embodiments, the communications device in the vehicle accessory can be further configured to receive permission to transmit at least a portion of the payment information associated with the payment mechanism to the payment receiving mechanism. The vehicle accessory may be embodied, for example, as a side-view mirror, as a wheel, as a tire, as a rear-view mirror, or in some other way.

The vehicle 100 depicted in FIG. 1 may be embodied as a traditional automotive vehicle that is operated exclusively by a human driver. Alternatively, or in addition, the vehicle 100 depicted in FIG. 1 may be an autonomous vehicle in which operation of the vehicle 100 can be controlled by an autonomous driving system. In such embodiments, the vehicle 100 may include other resources not explicitly illustrated in FIG. 1 such as, for example, one or more sensors, one or more processing devices for supporting the execution of autonomous driving software, one or more storage devices for storing the autonomous driving software (as well as other data, code, and so on), one or more networking resources, one or more data communications resources, and so on.

Although the vehicle 100 depicted in FIG. 1 is shown as car, it is understood that other vehicles 100 may be configured for contactless payment according to some embodiments of the present disclosure. For example, in other embodiments the vehicle 100 may be embodied as a motorcycle, scooter, a motorized self-transporter, watercraft, unmanned aerial vehicle ('IJAV'), or other vehicles as can be appreciated. Moreover, it is understood that communications devices 102 and data communications resources may also be included in the vehicle 100.

Contactless payment from a vehicle 100 in accordance with the present disclosure is generally implemented with computers, that is, with automated computing machinery. For further explanation, therefore, FIG. 2 sets forth a block diagram of automated computing machinery comprising an example computing system 202 configured for contactless payment from a vehicle according to some embodiments of the present disclosure. The computing system 202 of FIG. 2 includes a Central Processing Unit ('CPU') 204 as well as random access memory ('RAM') 206 which is connected through a high speed memory bus 208 and bus adapter 210 to the CPU 204 via a front side bus 211 and to other components of the computing system 202. Although a CPU 204 is illustrated in the example depicted in FIG. 2, in other embodiments other forms of processing devices may be utilized such as, for example, an application-specific integrated circuit ('ASIC'), field-programmable gate array ('FPGA'), and so on.

Figure 2:
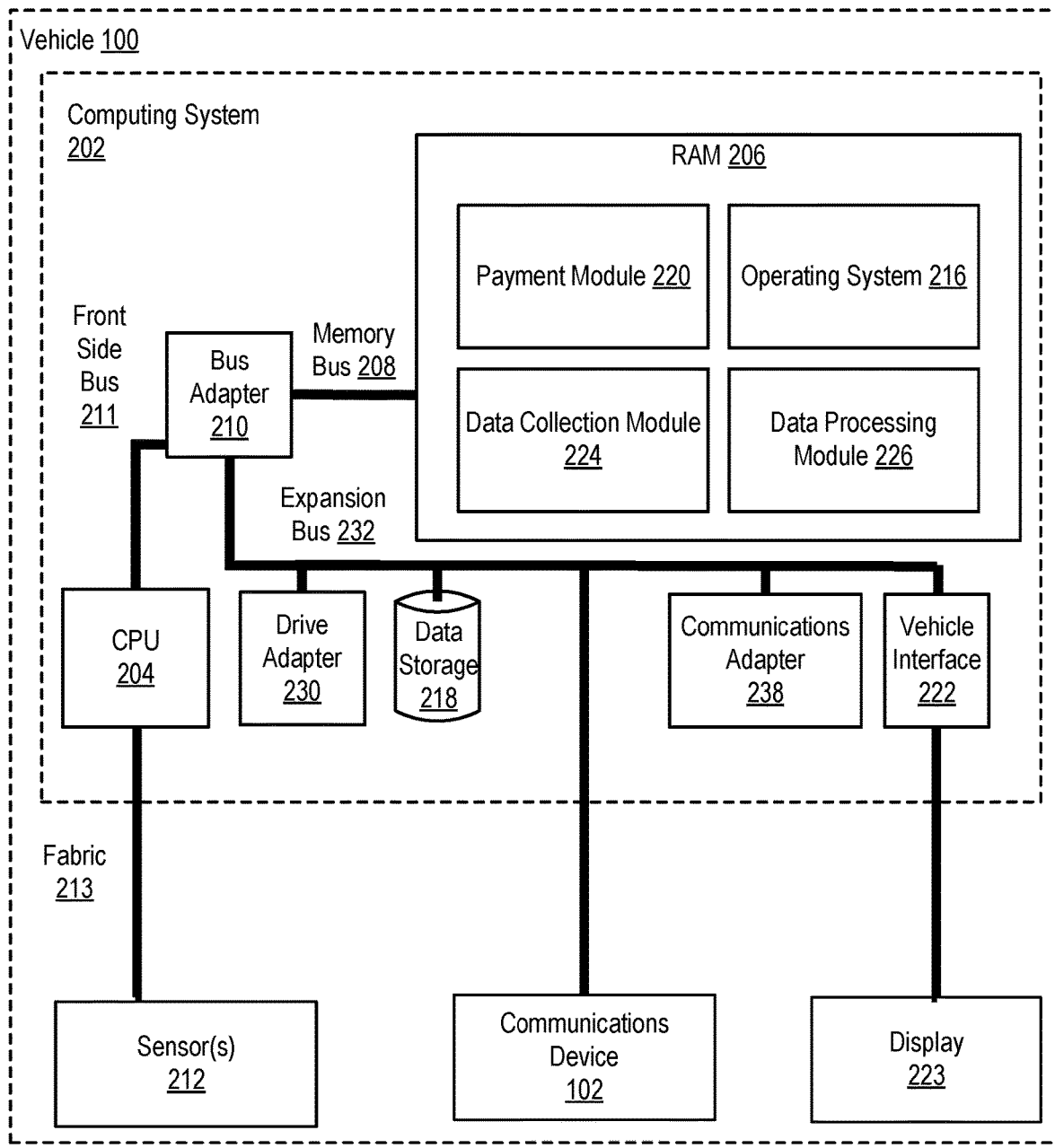
FIG. 2 sets forth a block diagram of automated computing machinery comprising an example computing system configured for contactless payment from a vehicle according to some embodiments of the present disclosure.

The CPU 204 depicted in FIG. 2 is communicatively coupled to one or more sensors 212. The sensors 212 may be embodied, for example, as a fingerprint scanner, as an imaging device such as an optical sensor or camera, and so on. Although the sensors 212 are shown as being external to the computing system 202, it is understood that one or more of the sensors 212 may reside as a component of the computing system 202 (e.g., on the same board, within the same housing or chassis). The sensors 212 may be communicatively coupled with the CPU 204 via a fabric 213 that comprises a communications topology (e.g., wired and/or wireless buses, communications paths, communications devices) through which the CPU 204 and sensors 212 are coupled for data communications.

Stored in RAM 206 is a payment module 220. The payment module 220 may be embodied as a module of computer program instructions that, when executed, cause the vehicle 100 to carry out the steps of: configuring the vehicle with payment information associated with a payment mechanism; receiving a request for payment from a payment recipient; and transmitting, from the vehicle to a payment receiving mechanism, at least a portion of the payment information associated with a payment mechanism. The payment module 220 may further include computer program instructions that, when executed, cause the vehicle 100 to carry out the step of requesting permission to transmit at least a portion of the payment information associated with the payment mechanism to the payment receiving mechanism. The payment module 220 may further include computer program instructions that, when executed, cause the vehicle 100 to carry out the step of receiving permission to transmit at least a portion of the payment information associated with the payment mechanism to the payment receiving mechanism. The payment module 220 may be configured such that receiving, by the vehicle, permission to transmit at least a portion of the payment information associated with the payment mechanism to the payment receiving mechanism further comprises verifying biometric information associated with the payment mechanism. The payment module 220 may further be configured such that verifying biometric information associated with the payment mechanism further comprises obtaining biometric information using one or more biometric sensors of the vehicle. The payment module 220 may be further configured such that verifying biometric information associated with the payment mechanism further comprises receiving, by the vehicle from another computing device that includes one or more biometric sensors, biometric information.

Further stored in RAM 206 is a data collection module 224 configured to process and/or store sensor data received from the one or more sensors 212. In such an example, processing such data may include handing off sensor data to the payment module 220 that the payment module 220 may use as input to a decision-making process. Also stored in RAM 206 is a data processing module 226. The data processing module 226 may be configured to perform one or more processes on stored sensor data (e.g., stored in data storage 218 by the data collection module 224) prior to the sensor data being passed to the payment module 220. Such operations can include filtering, compression, encoding, decoding, or other operations as can be appreciated.

Further stored in RAM 206 is an operating system 216. Operating systems 216 useful in vehicles in accordance with some embodiments of the present disclosure include UNIX™, Linux™, Microsoft Windows™, AIX™, IBM's i OS™, and others as will occur to those of skill in the art. The payment module 220, data collection module 224, data processing module 226, and operating system 216 in the example of FIG. 2 are shown in RAM 206, but many components of such software may alternatively be stored in non-volatile memory also, such as, for example, on data storage 218, such as a disk drive. Moreover, any of the payment module 220, data collection module 224, and data processing module 226 may be executed in a virtual machine and facilitated by a guest operating system of that virtual machine.

The computing system 202 of FIG. 2 includes disk drive adapter 230 coupled through expansion bus 232 and bus adapter 210 to CPU 204 and other components of the computing system 202. Disk drive adapter 230 connects non-volatile data storage to the computing system 202 in the form of data storage 218 (which may in alternative embodiments be accessible directly via the expansion bus 232 without going through the disk drive adapter). Disk drive adapters 230 useful in computers configured for contactless payment from a vehicle according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The computing system 202 of FIG. 2 also includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for contactless payment from a vehicle according to embodiments of the present invention include modems for wired dial-up communications, Ethernet (IEEE 802.3) adapters for wired data communications, 802.11 adapters for wireless data communications, as well as mobile adapters (e.g., cellular communications adapters) for mobile data communications.

Readers will appreciate that although the example embodiment depicted in FIG. 2 relates to an embodiment where all of the components of the computing system 202 are included within a vehicle, other embodiments are within the scope of the present disclosure. For example, some components of the computing system 202 may reside within other devices, that may or may not be part of the vehicle 100 itself. For example, sensors in mobile communications device such as a smartphone may be leveraged as an alternative to (or in addition to) the computing system 202 itself providing the sensors. Likewise, some of the data referenced below (e.g., payment information) may be stored on a driver or passenger mobile device, stored on a server, or stored elsewhere.

Figure 3:
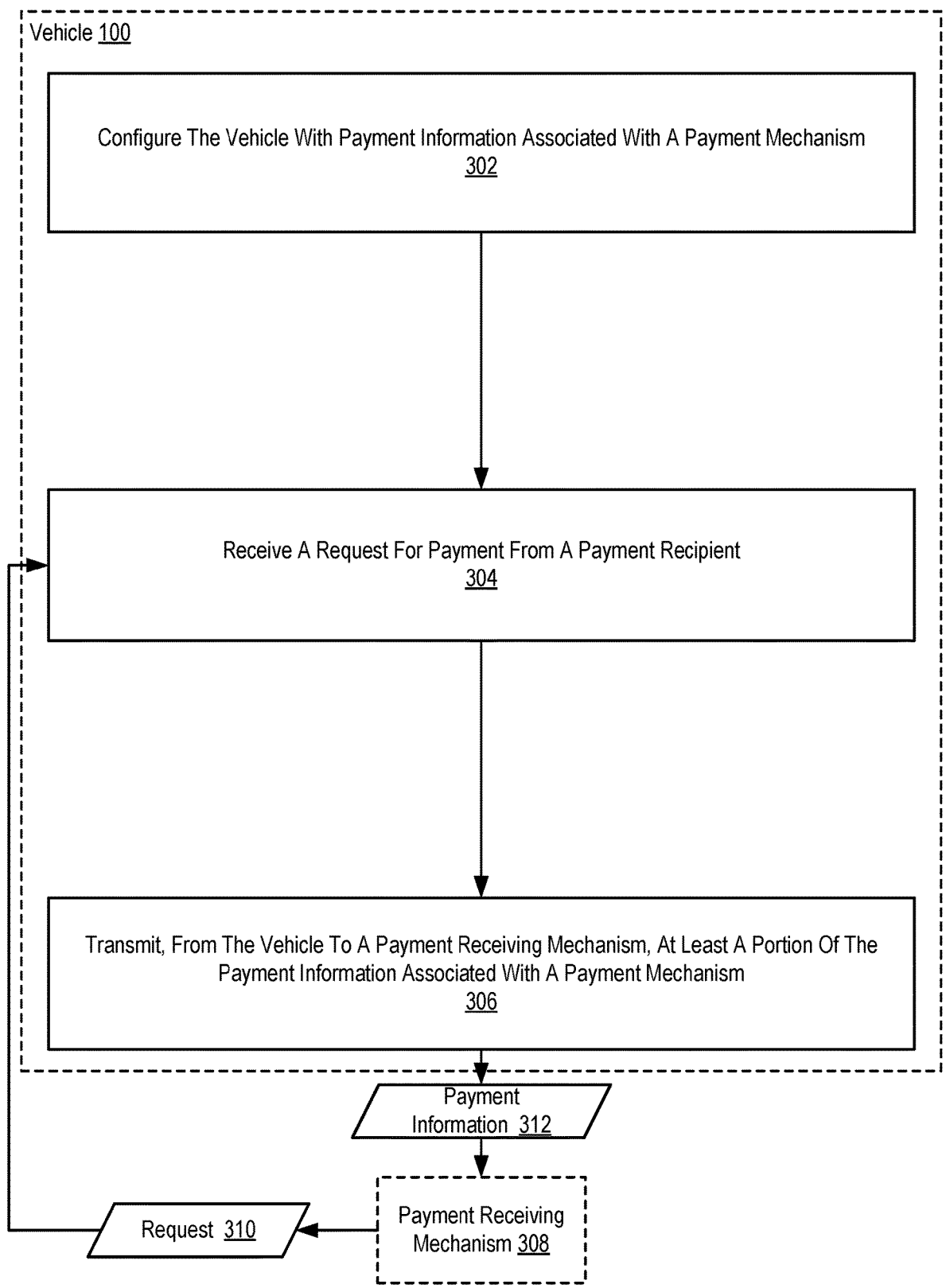
FIG. 3 sets forth a flow chart illustrating an example method of contactless payment from a vehicle in accordance with some embodiments of the present disclosure.

For further explanation, FIG. 3 sets forth a flow chart illustrating an example method of contactless payment from a vehicle 100 in accordance with some embodiments of the present disclosure. The example method depicted in FIG. 3 is carried out, at least in part, by a vehicle 100 that may be similar to the vehicles described above with reference to FIG. 1 and FIG. 2.

The example method depicted in FIG. 3 includes configuring 302 the vehicle 100 with payment information associated with a payment mechanism. A payment mechanism, as the term is used here, may be embodied as, for example, a credit card, a debit card, a bank account, a mobile payment service account, or some other mechanism through which payment may be delivered for goods and services received. The payment information that is associated with a particular payment mechanism may be embodied, for example, as a credit card number, expiration date, security code, personal identification number ('PIN'), account number, routing number, and so on. In the example method depicted in FIG. 3, configuring 302 the vehicle 100 with payment information associated with a payment mechanism may be carried out, for example, by storing such information within a storage device that is included in the vehicle 100. Such information may be communicated to one or more computing devices with the vehicle 100, for example, via a user interface such as a touchscreen display that a user utilizes to enter such information through a GUI, through the use of software such as electronic wallet software that is executing on a computing device within the vehicle 100 that may receive such information by synchronizing with an electronic wallet application that is executing on another computing device (e.g., a smart phone of an owner, driver, passenger, or other person associated with the vehicle), through the use of a scanner or similar device within the vehicle 100 that may scan a credit card, or in some other way.

Although the embodiment described above relates to an embodiment in which components within the vehicle 100 itself are used to store payment information as part of configuring 302 the vehicle 100 with payment information associated with a payment mechanism, in other embodiments configuring 302 the vehicle with payment information may be carried out by communicably coupling the vehicle 100 with some other device. For example, a communications device within the vehicle 100 may be communicatively coupled with another device such as the user's phone via Bluetooth, USB, or some other mechanism. In such an embodiment, a transmitter or other communications device that is embedded within or otherwise attached to the vehicle (e.g., a side-view mirror transmitter) may be used to relay information received from the other device (e.g., a user's phone). In such embodiments, an already existing phone-based mobile payment framework may be utilized, but contactless payment can still occur as the transmitter within the side-view mirror may automatically transmit data that it received from the user's phone to a payment receiving mechanism 308.

The example method depicted in FIG. 3 also includes receiving 304 a request 310 for payment from a payment recipient, which is depicted in FIG. 3 as being embodied as a payment receiving mechanism 308. The payment receiving mechanism 308 depicted in FIG. 3 may be embodied, for example, as a payment terminal (also referred to as a Point of Sale ('POS') terminal) that may be used by a vendor to accept payment for goods and services. The payment receiving mechanism 308 may include one or more communications interfaces such as, for example, a Bluetooth communications device, a near field communications device, or other wireless communications device that enables the payment receiving mechanism 308 to communication wirelessly with other devices (e.g., such as a near field communications device that is embedded within the vehicle). In such embodiments, the payment receiving mechanism 308 may issue a request 310 for payment upon detecting the presence of another device (e.g., upon detecting the presence of another near field communications device), at the request of a user of the payment terminal (e.g., an employee of the vendor that is requesting payment), or in response to some other event. In such an example, the payment receiving mechanism 308 may be configured to issue one or more messages in accordance with a predetermined protocol that includes, for example, an amount of payment requested, a transaction number, a vendor ID, and other information. Such a message may be received 304, for example, by a communications device that is included within the vehicle 100 and may be interpreted by computing devices within the vehicle 100 as a request for payment.

Readers will appreciate that although the embodiment depicted in FIG. 3 relates to an embodiment where payment is ultimately delivered in response to the vehicle 100 receiving 304 a request 310 for payment, in other embodiments such a request 310 may not be received and payment may be initiated in another way (e.g., by the vehicle 100 itself initiating payment). Thus, embodiments of the present disclosure may operate based on a "pull-based" protocol or a "push-based" protocol. In push-based protocols, a request for payment may not be communicated before payment information is provided. The specific steps involved may vary depending on the specific implementation. To illustrate, payment information may be communicated to a payment receiving mechanism in response to some a user input (e.g., at a mobile device within the vehicle 100 and communicably coupled to the vehicle (e.g., via Bluetooth or USB), at a steering wheel of the vehicle 100, at a dashboard of the vehicle, etc.). As another example, payment information may be communicated, via near-field communication NFC or another communication protocol, to a payment receiving mechanism in response to a transmitter device (e.g., in a side-view mirror of the vehicle 100) coming near a receiver device (e.g., near a restaurant drive-thru window).

The example method depicted in FIG. 3 also includes transmitting 306, from the vehicle 100 to the payment receiving mechanism 308, at least a portion of the payment information 312 associated with the payment mechanism. In the example method depicted in FIG. 3, the payment information 312 associated with the payment mechanism may be transmitted 306 via a communications device (e.g., communications device 102 of FIG. 1 or FIG. 2) such as an NFC transponder, a Bluetooth enabled device, or some other communications devices configured for wireless data communications with the payment receiving mechanism 308.

Figure 4:
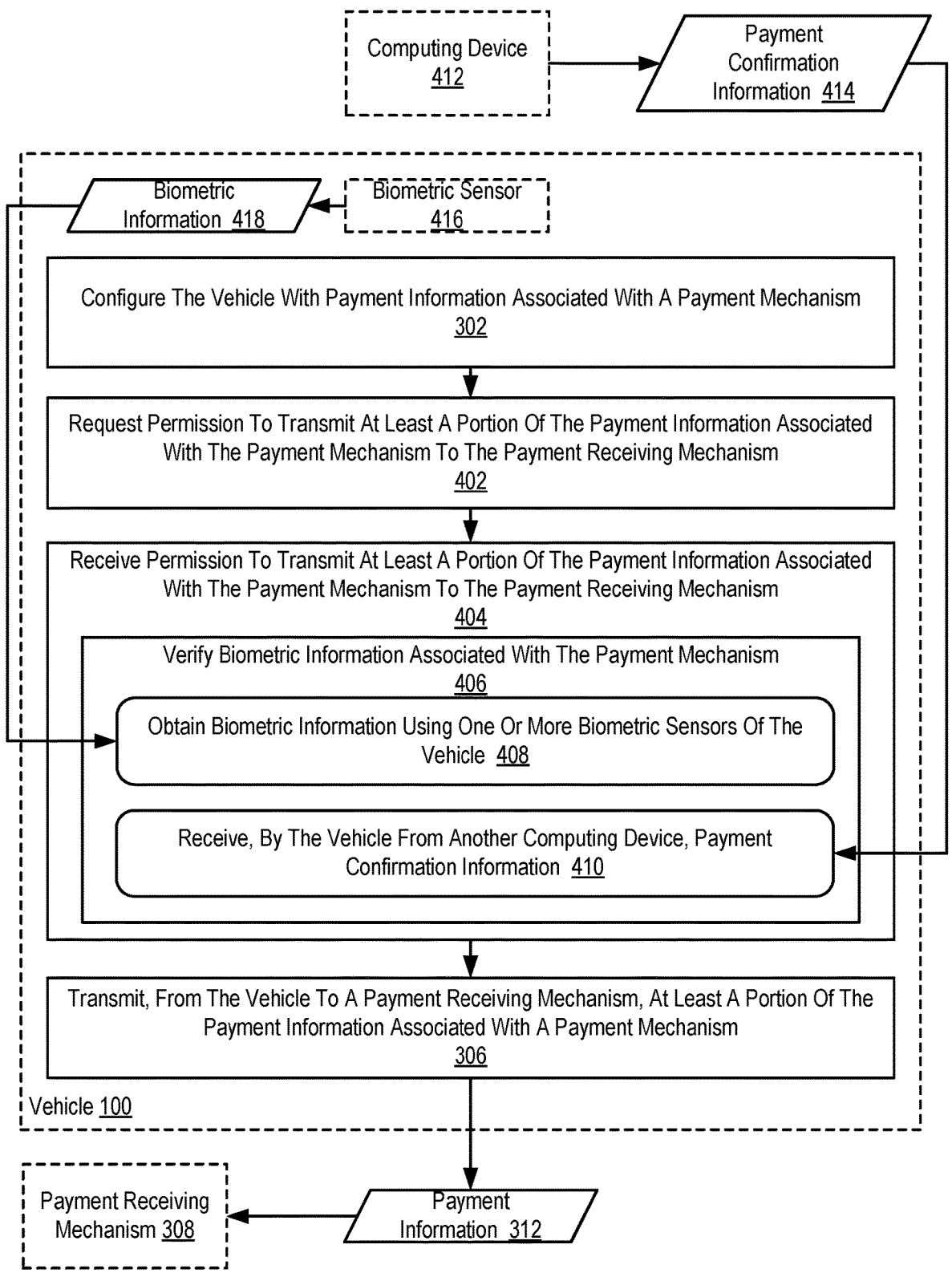
FIG. 4 sets forth a flow chart illustrating an example method of contactless payment from a vehicle in accordance with some embodiments of the present disclosure.

For further explanation, FIG. 4 sets forth a flow chart illustrating an additional example method of contactless payment from a vehicle 100 in accordance with some embodiments of the present disclosure. The example method depicted in FIG. 4 is carried out, at least in part, by a vehicle 100 that may be similar to the vehicles described above with reference to FIG. 1 and FIG. 2. The example method depicted in FIG. 4 is similar to the example method depicted in FIG. 3, as the example method depicted in FIG. 4 also includes configuring 302 the vehicle 100 with payment information associated with a payment mechanism and transmitting 306, from the vehicle 100 to the payment receiving mechanism 308, at least a portion of the payment information 312 associated with the payment mechanism. Unlike the example method depicted in FIG. 3, the example method depicted in FIG. 4 does not include receiving 304 a request 310 for payment from a payment recipient, which is depicted in FIG. 3 as being embodied as a payment receiving mechanism 308, although such a step could be incorporated into example methods in accordance with some embodiments of the present disclosure.

The example method depicted in FIG. 4 includes requesting 402, by the vehicle 100, permission to transmit at least a portion of the payment information 312 associated with the payment mechanism to the payment receiving mechanism 308. The vehicle 100 may request 402 permission to transmit payment information 312 to the payment receiving mechanism 308 in order to prevent unintended or unauthorized transactions from being processed, in order to prevent such payment information 312 from being obtained illegally or fraudulently, and so on. In such an example, the vehicle 100 may request 402 permission to transmit at least a portion of the payment information 312 associated with the payment mechanism to the payment receiving mechanism 308 in a variety of ways. For example, a display screen (e.g., display 223 of FIG. 2) within the vehicle 100 may present the driver (or other vehicle occupant) with information identifying the vendor, an amount of payment requested, or other information describing the transaction. In such an example, the driver (or other vehicle occupant) may be prompted to authorize the transaction by tapping a touchscreen display at a designated location, by entering a PIN or other authorization code, by pressing a thumb/finger on a fingerprint scanner, by placing their face in view of an optical sensor that is used by facial recognition software, or in other ways.

The example method depicted in FIG. 4 also includes receiving 404, by the vehicle 100, permission to transmit at least a portion of the payment information 312 associated with the payment mechanism to the payment receiving mechanism 308. The vehicle 100 may receive 404 permission to transmit at least a portion of the payment information 312 associated with the payment mechanism to the payment receiving mechanism 308, for example, upon determining that a user has performed a requested action (touching a touchscreen display at a predetermined location, entering a valid PIN or code, etc.), upon determining that information gathered by a sensor matches predetermined authorization information (e.g., a matching fingerprint, a matching face, etc.) associated with the payment mechanism, or in some other way. Once permission has been received, the vehicle 100 may be free to transmit 306 at least a portion of the payment information 312 associated with the payment mechanism to the payment receiving mechanism 308.

In the example method depicted in FIG. 4, receiving 404 permission to transmit at least a portion of the payment information 312 associated with the payment mechanism to the payment receiving mechanism 308 can include verifying 406 biometric information associated with the payment mechanism. In the example method of FIG. 4, when configuring 302 the vehicle 100 with payment information associated with a payment mechanism, biometric information associated with the payor may be captured and included within a profile or otherwise associated with the payment mechanism. In such an example, in order to receive 404 permission to transmit at least a portion of the payment information associated with the payment mechanism to the payment receiving mechanism 308, the vehicle 100 and/or computing devices contained therein may be required to capture biometric information to verify 406 that biometric information associated with the payment mechanism matches the captured biometric information. To that end, the example method depicted in FIG. 4 includes obtaining 408 biometric information 418 using one or more biometric sensors 416 of the vehicle 100.

Consider an example in which, when configuring 302 the vehicle 100 with payment information associated with a particular credit card, biometric information (e.g., a fingerprint, a face, etc.) associated with the account holder may be captured and associated with the particular credit card. In such an example, when an attempt is made to use the credit card to conduct a financial transaction, biometric information may be obtained 408 from one or more biometric sensors in the vehicle 100 and compared to the biometric information associated with the credit card. If a match is detected, the vehicle 100 may assume that permission to transmit at least a portion of the payment information 312 associated with the payment mechanism to the payment receiving mechanism 308 has been received 404. If a match is not detected, the vehicle 100 may not transmit the payment information 312 or may conduct additional operations to attempt to verify that the financial transaction is authorized.

Readers will appreciate that in some embodiments, rather than using biometric sensors that are included within the vehicle 100 itself, biometric sensors that are included in other computing devices (e.g., a mobile phone, a smart watch) may be utilized. As such, in the example method depicted in FIG. 4, verifying 406 biometric information associated with the payment mechanism can alternatively include receiving 410, from another computing device 412, payment confirmation information 414. In some embodiments, such payment confirmation information 414 may be embodied as biometric information that is captured by one or more biometric sensors that are include within (or otherwise coupled to) the computing device 410. In other embodiments, such payment confirmation information 414 may not include data that is evaluated by the vehicle 100 itself, but instead may represent more of an instruction to the vehicle 100 that permission to transmit at least a portion of the payment information 312 associated with the payment mechanism to the payment receiving mechanism 308 has been granted. In such embodiments, a trust relationship may need to be established between the computing device 412 and the vehicle 100 prior to actually performing any financial transactions (e.g., when configuring 302 the vehicle 100 with payment information associated with a payment mechanism and transmitting 306).

It is also to be understood that the relative spacing between the various steps in FIG. 3 and FIG. 4 are for illustration only, and are not to be considered limiting. For example, a vehicle user may authorize payment to a specific vendor before leaving their car in a parking lot or a parking garage to go shopping at a mall or retail establishment. While the user is away, a car detailing service, car cleaning service, package delivery service, etc. may provide service and then collect payment, such as by moving a mobile payment information receiving device near a driver's side mirror of the vehicle. The vehicle may confirm that the receiving device is associated with the authorized vendor, and, if so, may complete the payment process.

In view of the explanations set forth above, readers will recognize that the benefits of contactless payment from a vehicle according to embodiments of the present invention may include:

- Increased safety and reduced exposure between drivers and vendors (e.g., drive-thru restaurant vendors, curbside pickup vendors, to-your-trunk package delivery vendors, etc.), which may be of particular importance in situations where viruses such as COVID-19 are active in the community.
- Increased convenience for vehicle operators, for example to pay for fuel, air, water, car wash, etc. for the vehicle even when a conventional or expected monetary form of payment (e.g., the correct denomination of coins) is unavailable
- The ability to have a vehicle, particularly autonomous vehicles, be able to receive service (thereby improving the operation of the vehicle) and pay for such service without intervention from a driver or owner of the vehicle.
- Enabling the vehicle to perform tasks that would otherwise need to be performed by the driver of the vehicle, which may be of particular benefit to drivers with reduced physical capabilities or drivers constrained by other conditions (e.g., a sleeping child in the vehicle).

Exemplary embodiments of the present invention are described largely in the context of a fully functional computer system in a vehicle. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for contactless payment from a vehicle, the method comprising:
communicatively coupling, via a connection, the vehicle with a mobile device storing payment information associated with a payment mechanism, wherein the connection comprises a wired connection or a Bluetooth connection;
receiving, by the vehicle, a request for payment from a payment recipient;
transmitting, by the vehicle to the mobile device via the connection, the request for payment;
receiving, by the vehicle from the mobile device via the connection and in response to the request for payment, at least a portion of the payment information associated with the payment mechanism;
receiving, by the vehicle, permission to transmit the at least a portion of the payment information associated with the payment mechanism to the payment receiving mechanism, wherein receiving, by the vehicle, permission to transmit the at least a portion of the payment information associated with the payment mechanism to the payment receiving mechanism further comprises verifying biometric information associated with the payment mechanism, wherein verifying the biometric information associated with the payment mechanism further comprises receiving, by the vehicle from another computing device that includes one or more biometric sensors, the biometric information; and
transmitting, from the vehicle to a payment receiving mechanism, the at least a portion of the payment information associated with the payment mechanism received from the mobile device in response to the mobile device receiving the request from the vehicle.

2. The method of claim 1 further comprising requesting, by the vehicle, permission to transmit at least a portion of the payment information associated with the payment mechanism to the payment receiving mechanism.

3. The method of claim 1, wherein verifying the biometric information associated with the payment mechanism further comprises obtaining the biometric information using one or more biometric sensors of the vehicle.

4. An apparatus for contactless payment from a vehicle, the apparatus configured to perform the steps of:
communicatively coupling, via a connection, the vehicle with a mobile device storing payment information associated with a payment mechanism;
receiving, by the vehicle, a request for payment from a payment recipient;
transmitting, by the vehicle to the mobile device via the connection, the request for payment;
receiving, by the vehicle from the mobile device via the connection and in response to the request for payment, at least a portion of the payment information associated with the payment mechanism;
receiving, by the vehicle, permission to transmit the at least a portion of the payment information associated with the payment mechanism to the payment receiving mechanism, wherein receiving, by the vehicle, permission to transmit the at least a portion of the payment information associated with the payment mechanism to the payment receiving mechanism further comprises verifying biometric information associated with the payment mechanism, wherein verifying the biometric information associated with the payment mechanism further comprises receiving, by the vehicle from another computing device that includes one or more biometric sensors, the biometric information; and
transmitting, from the vehicle to a payment receiving mechanism, the at least a portion of the payment information associated with the payment mechanism received from the mobile device in response to the mobile device receiving the request from the vehicle.

5. The apparatus of claim 4 further configured to perform the step of requesting, by the vehicle, permission to transmit at least a portion of the payment information associated with the payment mechanism to the payment receiving mechanism.

6. The apparatus of claim 5, wherein verifying the biometric information associated with the payment mechanism further comprises obtaining the biometric information using one or more biometric sensors of the vehicle.

7. A vehicle for contactless payment, comprising:
an apparatus configured to perform the steps:
communicatively coupling, via a connection, the vehicle with a mobile device storing payment information associated with a payment mechanism;
receiving, by the vehicle, a request for payment from a payment recipient;
transmitting, by the vehicle to the mobile device via the connection, the request for payment;
receiving, by the vehicle from the mobile device via the connection and in response to the request for payment, at least a portion of the payment information associated with the payment mechanism;
receiving, by the vehicle, permission to transmit the at least a portion of the payment information associated with the payment mechanism to the payment receiving mechanism, wherein receiving, by the vehicle, permission to transmit the at least a portion of the payment information associated with the payment mechanism to the payment receiving mechanism further comprises verifying biometric information associated with the payment mechanism, wherein verifying the biometric information associated with the payment mechanism further comprises receiving, by the vehicle from another computing device that includes one or more biometric sensors, the biometric information; and
transmitting, from the vehicle to a payment receiving mechanism, the at least a portion of the payment information associated with the payment mechanism received from the mobile device in response to the mobile device receiving the request from the vehicle.

8. The vehicle of claim 7, wherein the apparatus is further configured to perform the step of requesting, by the vehicle, permission to transmit at least a portion of the payment information associated with the payment mechanism to the payment receiving mechanism.

9. The vehicle of claim 7, wherein verifying the biometric information associated with the payment mechanism further comprises obtaining the biometric information using one or more biometric sensors of the vehicle.

10. The vehicle of claim 7, wherein the apparatus is further configured to perform the step of receiving the request for payment from a payment recipient.

11. The vehicle of claim 7 further comprising an embedded communications device located within the vehicle, wherein the portion of the payment information associated with the payment mechanism is transmitted using the embedded communications device.

* * * * *